United States Patent [19]

Ryczek

[11] Patent Number: 5,471,052
[45] Date of Patent: Nov. 28, 1995

[54] COLOR SENSOR SYSTEM USING A SECONDARY LIGHT RECEIVER

[75] Inventor: Lawrence J. Ryczek, Oconomowoc, Wis.

[73] Assignee: Eaton Corporation, Cleveland, Ohio

[21] Appl. No.: 140,837

[22] Filed: Oct. 25, 1993

[51] Int. Cl.$^6$ .............................. H01J 5/16; H01J 40/14
[52] U.S. Cl. ................ 250/226; 250/214 C; 250/227.11; 250/227.25
[58] Field of Search ........................... 250/223 R, 214 C, 250/214 R, 205, 226, 227, 227.11, 227.21

[56] References Cited

U.S. PATENT DOCUMENTS

| | | | |
|---|---|---|---|
| 4,783,591 | 11/1988 | Sullivan | 250/226 |
| 4,810,873 | 3/1989 | Ammann et al. | 250/227 |
| 4,917,500 | 4/1990 | Lugos | 356/406 |
| 4,937,441 | 6/1990 | Ishizawa et al. | 250/205 |
| 4,940,889 | 7/1990 | Ono et al. | 250/214 |
| 4,987,298 | 1/1991 | Inagaki | 250/214 |
| 5,008,525 | 4/1991 | Petronio | 250/214 |
| 5,015,839 | 5/1991 | Tanikoshi | 250/214 |
| 5,019,704 | 5/1991 | Zimmermann et al. | 250/214 |
| 5,021,645 | 6/1991 | Satula et al. | 250/223 |
| 5,029,277 | 7/1991 | Kane | 250/214 |
| 5,039,191 | 8/1991 | Myszka | 385/31 |
| 5,150,174 | 9/1992 | Ryczek et al. | 356/402 |
| 5,233,408 | 8/1993 | Satula | 250/226 |
| 5,336,900 | 8/1994 | Peters et al. | 250/226 |

*Primary Examiner*—William L. Sikes
*Assistant Examiner*—Fetsum Abraham
*Attorney, Agent, or Firm*—Loren H. Uthoff, Jr.

[57] ABSTRACT

A system for photoelectrically sensing the color of an object includes two or more light sources having different characteristic ranges of chromaticity and one primary photosensitive element which receives light from the light sources after it has reflected off of the target object and a secondary photosensitive element which receives light from the light sources prior to reflection off of the target. A divider element divides the output of the primary photosensitive element by the output of the secondary photosensitive element to automatically align the signal representative of the color of the object for variation in the light power output of the light sources. In an alternate embodiment, the output of the secondary photosensitive receiver is used as a closed loop feedback signal to regulate the light power output of the light sources.

18 Claims, 6 Drawing Sheets

FIG 4
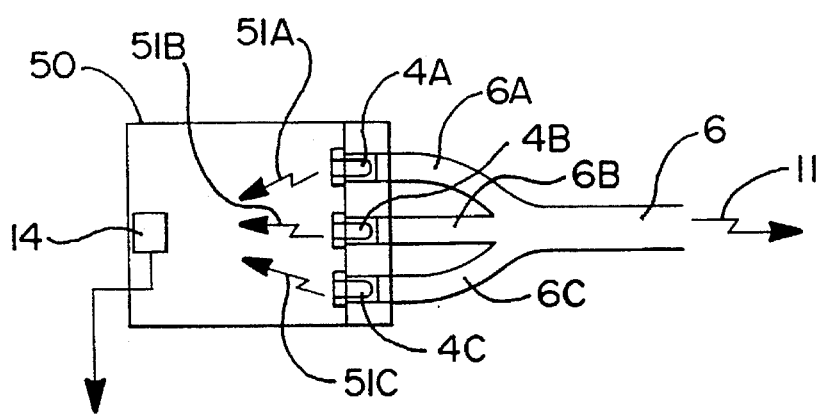
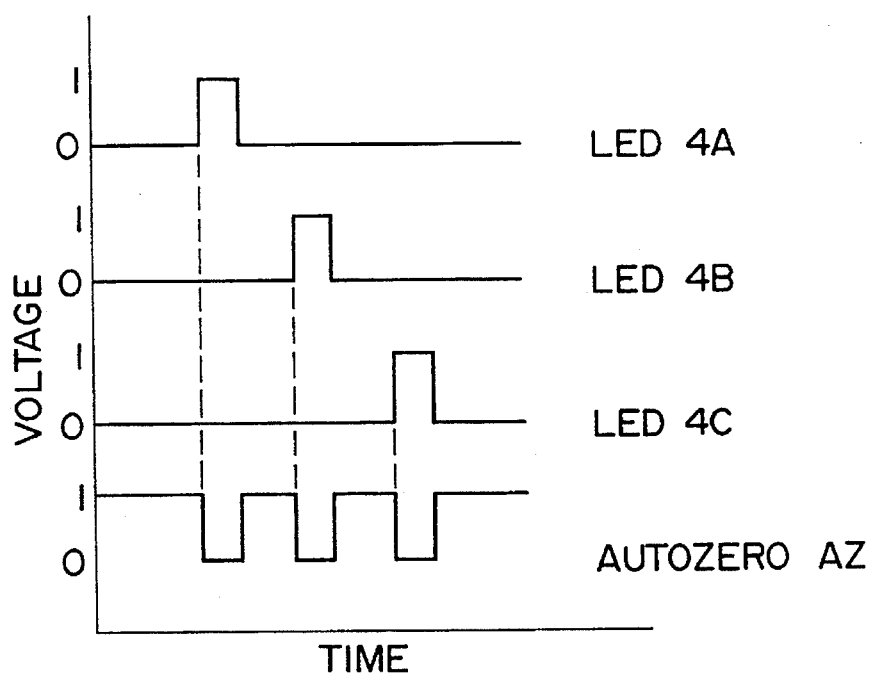
FIG 5

COLOR SENSOR SYSTEM USING A SECONDARY LIGHT RECEIVER

FIELD OF THE INVENTION

The invention relates to a color sensor system for the recognition objects with surfaces that are at least partly colored and more specifically, to a color sensor system where the light output power of a plurality of light emitting diodes is controlled through the use of a secondary receiver and electronic circuit.

DESCRIPTION OF THE PRIOR ART

In prior art color recognition devices, three electronic light transmitters such as light emitting diodes, are used to illuminate an object whose color is to be measured by emitting light pulses in a predetermined narrow-band range of wavelengths. The light pulses are carried from the light transmitters to the object by way of a fiberoptic cable or other type of optical coupling device for carrying the light generated by the plurality of light emitting diodes to the object whose color is to be measured. A transmitter control device is coupled to the electronic light transmitters establishing at least one control cycle during which said light pulses successfully illuminate the color surface of the object under examination for a brief period of time. An electronic light receiver then receives the light reflected from the colored surface in response to the arrival of each the light pulses and converts them into electrical signals having an intensity corresponding to that of the reflected light. An evaluation device which is coupled to the electronic light receiver then makes a color determination based on the intensity of the received individual electrical signals arriving in the course of the control cycle.

Since the light emitting diodes or other type of light transmitters often vary in output according to the ambient temperature, at least one temperature sensor is used to supply temperature data with regard to the ambient temperature to the transmitting control device and the evaluation device wherein the transmitting control device supplies, in the course of the control cycle, current pulses to the electronic light transmitters which are individually determined in accordance with a table correlating the temperature data and stored data relating to the temperature dependency emission curves of the light transmitters which are then adjusted in an output for successfully illuminating the colored surface with light pulses of predetermined intensity. The evaluation device also makes a compensation for the received individual signals based upon the temperature data and the stored data relating to the temperature dependency conversion curve of the light receiver. The final color recognition determination is then made by comparing received individual electrical signals with stored value for the color recognition determination.

One of the limitations to this approach is that the accuracy of the light power output of the light transmitters depends on the predictability of their output in relation to the ambient temperature as predetermined and programmed into the electronic control system. Another limitation that results in measurement inaccuracies is due to the drift of the electronic components that make up the electronic control circuitry along with the drift of the characteristic of the light emitting diodes themselves.

SUMMARY OF THE INVENTION

In accordance with the principles of the invention, color recognition of an object is achieved by providing a color sensor system comprising at least three electronic light sources, such as light emitting diodes (LEDs), which emit light pulses in a predetermined narrow-band range of wavelengths using a control device which is commonly a microprocessor coupled to the electronic light transmitters for establishing at least one control cycle during which the light pulses successively illuminate color surface of the object under examination for a brief period of time. According to the present invention, the light emitted from the light sources is carried to the object of the color to be measured using a fiberoptic bundle. According to one embodiment of the present invention, a portion of the fiberoptic bundle is split off and directed back towards a secondary receiver which measures the light output from the split off fiberoptic cable and then uses that signal to either regulate the output of the light transmitters and/or make correction for drift of the output of the light sources in the calculation of the level of reflected light from the object whose color is to be measured and the use of an autozero signal to prevent electronic saturation when the light sources are off.

In another embodiment of the present invention, a secondary light receiver is disposed within a light box which contains the light transmitters wherein the light output power off the back of the light emitting diodes is measured and used to regulate the transmitter control device which powers the light emitting diodes and/or to make an adjustment in the measured reflected light from the object whose colors is measured to account for variation in the light output of the light transmitters. In this manner, an adjustment is made for variation in the light power output from the light transmitters automatically without reference to a calibration table of temperature data and stored data relating to temperature dependency emission curves for the light transmitter devices such as light emitting diodes. No adjustment is made for the temperature sensitivity of the receiver using the present invention so other methods must be used to account for these variations such as that described in the prior art using the temperature data and stored data relating to temperature dependency conversion curves of the light receiver.

One provision of the present invention is to regulate the light output level of a plurality of LED devices using a secondary light receiver.

Another provision of the present invention is to regulate the light output power of a plurality of LED devices where the LED light output is transmitted to an object whose color is to be measured using a fiberoptic bundle where a portion of the fiberoptic bundle is split and returned to the light control device for use in light output regulation.

Another object of the present invention is to regulate the light output of a plurality of light emitting diodes whose light output is transmitted to an object whose color is to be measured using a fiberoptic bundle where a portion of the fiberoptic bundle is split away and directed back towards a control device where the light output from the split fiberoptic bundle is directed toward a secondary light receiver.

Still another object in the present invention is to provide a high bandwidth electronic method to account for variations in the light output from the light transmitter by measuring a portion of the light output using a secondary receiver whose output signals are electronically manipulated for use in regulation of the light sources or to adjust other system signal levels.

Still another object of the present invention is to adjust the output signal of a primary receiver by dividing it with the output signal from a secondary receiver which responds to a portion of the light power output from the light source prior to reflection from the object whose color is to be measured.

Other features and advantages of the invention will become apparent in the description of the preferred embodiments and from the claims. For a more complete understanding of the present invention reference should be made to the following detailed description of the preferred embodiment of the invention and to the accompanying drawings.

BRIEF DESCRIPTION OF THE DRAWINGS

FIG. 4 is a schematic representation of the present invention where a secondary receiver is disposed in a light box for use in regulating the light output of a plurality of light emitting diodes;

FIG. 5 is a timing diagram of the present invention showing the LED energization and autozero signals;

DETAILED DESCRIPTION OF THE PREFERRED EMBODIMENT

Figure 1:
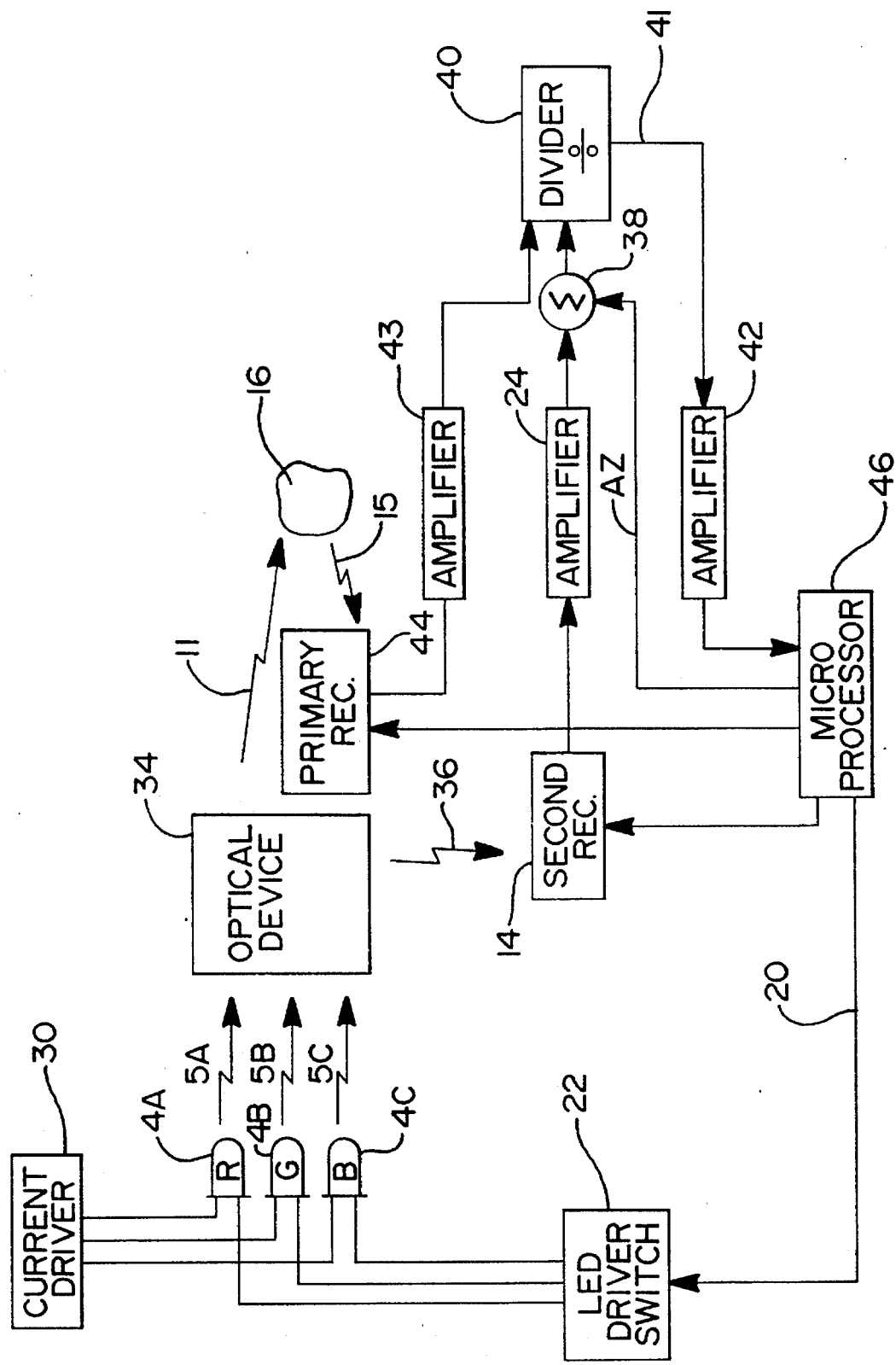
FIG. 1 is a schematic representation of the present invention where the output of a secondary receiver is mathematically manipulated and used to divide the output of the primary receiver.

FIG. 1 illustrates by way of a block diagram the major components of the preferred embodiment of the color sensor system of the present invention. The red, green, and blue light emitting diodes 4A, 4B and 4C respectively, are shown emitting light 5A, 5B and 5C towards an optical device 34 which according to the present invention is a fiberoptic bundle 6 (see FIG. 3). The fiberoptic bundle then transmits the light outputs 5A, 5B and 5C both to an object 16 whose color is to be measured and to a secondary receiver 14. The portion of the light output from the light emitting diodes 4A, 4B and 4C directed to the object 16 is represented by light output 11 and the portion of the light outputs 5A, 5B and 5C that is directed towards the secondary receiver 14 is labeled as light output 36.

The transmitted light output 11 reflects off the object 16 whose color is to be measured and is directed toward a primary receiver 44 whose output is connected to an amplifier 43 where the amplifier 43 output is then connected to a divider 40. The output from the secondary receiver 14 is connected to an electronic secondary amplifier 24 whose output is connected to a summing junction 38 where the output from the secondary amplifier 24 is added to a high or low amplitude of an autozero signal AZ. The output from the summing junction 38 is connected to the divider 40. In this manner, the reflected light 15 received by the primary receiver 44 is adjusted in amplitude at the divider 40 by the light from the optical device 36 such that variation in the light outputs 5A, 5B and 5C from the light emitting diodes 4A, 4B, and 4C respectively, is automatically adjusted by effectively dividing the output of the primary receiver 44 by the output of the secondary receiver 14 when any of the light emitting diodes (LEDs) 4A, 4B or 4C are energized. The measurement signal 41 is then connected to another amplifier 42 whose output is fed to a microprocessor 46 for interpretation and manipulation of the measurement signal 41 for use in control and/or measurement.

To determine the color of the object 16, the LEDs 4A, 4B and 4C are pulsed in sequence. The light emitting diodes 4A, 4B and 4C are shown where each emits light in a predetermined narrow band of wavelengths, commonly in wavelengths of 605 nm (amber) for LED 4A, 555 nm (green) for LED 4B, and 470 nm (blue) for LED 4C which emit light in those wavelengths when energized upon closure of the LED driver switch 22 and supplied with electrical current by current driver 30. The light output from the light emitting diodes 4A. 4B, and 4C is directed towards an object 16 whose color is to be measured and also to a secondary receiver 14 through an optical device 34 such as a fiberoptic cable. The LED driver switch 22 is controlled by a microcontroller 18 which outputs a signal 20 to the LED driver switch 22 that turns on in sequence the red LED, green LED, and blue LED 4A, 4B, and 4C respectively, using the electrical current from the current driver 30 as a power source.

It is contemplated that a suitable function and output indicator will be provided as well as an appropriate source of power for all of the components. For the sake of simplicity, a number of above described incidental or peripheral circuit elements are not described in detail herein, it being understood that such functions are well understood by those of ordinary skill in the art and that suitable componentry is commercially available. Thus, the reflected light 15 can be processed in a similar manner to that disclosed in U.S. Pat. Nos. 5,021,645 and 5,150,174, the disclosures of which are hereby incorporated by reference.

Thus, a red, green and blue pulse will appear in sequence at the output of the primary receiver 44. The amplitude of these pulses determines the color of the object 16. At the same time, a reference red, green, and blue pulse is received directly from the LEDs 4A, 4B and 4C by the secondary receiver 14. Thus, a red, green and blue secondary pulse 36 will appear both at the output of the secondary amplifier 24 and the primary amplifier 43 whereupon the output of the primary amplifier 43 is divided by the output of the secondary amplifier 24 by the divider 40. Thus, if the higher power output of the LEDs 4A, 4B and 4C has changed, the output of the primary amplifier 43 is automatically increased by its division by a smaller level of signal from the secondary amplifier 24. The output 41 of the divider 40 is amplified by amplifier 42 and fed to microprocessor 46. If the primary and secondary receivers are matched temperature and .drift are canceled by the divider 40 to reduce measurement errors. The secondary light pulse 36 could be direct, reflected, diffused, via a fiber or a light pipe to the secondary receiver 14.

After the secondary amplifier 24, the autozero signal AZ is combined with the output signal from the secondary receiver 14 at summing junction 38. The autozero signal AZ is held low by the microprocessor 46 when any one of the LEDs 4A, 4B or 4C is energized and is held high by the microprocessor 46 when all of the LEDs 4A, 4B and 4C are not energized. The introduction of a high level signal supplied by the microprocessor 46 as autozero signal AZ, which is added to the output of the secondary amplifier 24 in summing junction 38, is to prevent the low output from the secondary receiver 14 when the LEDs 4A, 4B, 4C are turned off from being used as the divisor in the divider 40. Division by a very small level could drive electronic components in the divider 40 into saturation which would compromise the performance of the system when the LEDs 4A, 4B or 4C are again energized.

One unique aspect of the color measurement system of the present invention is the compensation for drift in the electronic characteristic of most all of the system's electronic components by division of the output of the primary receiver by the output of the secondary receiver after some signal manipulation. In this manner, (assuming the drift characteristics of the two receivers due to temperature, age, etc. are approximately equivalent), the variation in LED light power output that would have to be accounted for usually through the use of a thermocouple and a look-up table is automatically compensated for in the divider element.

Figure 2:
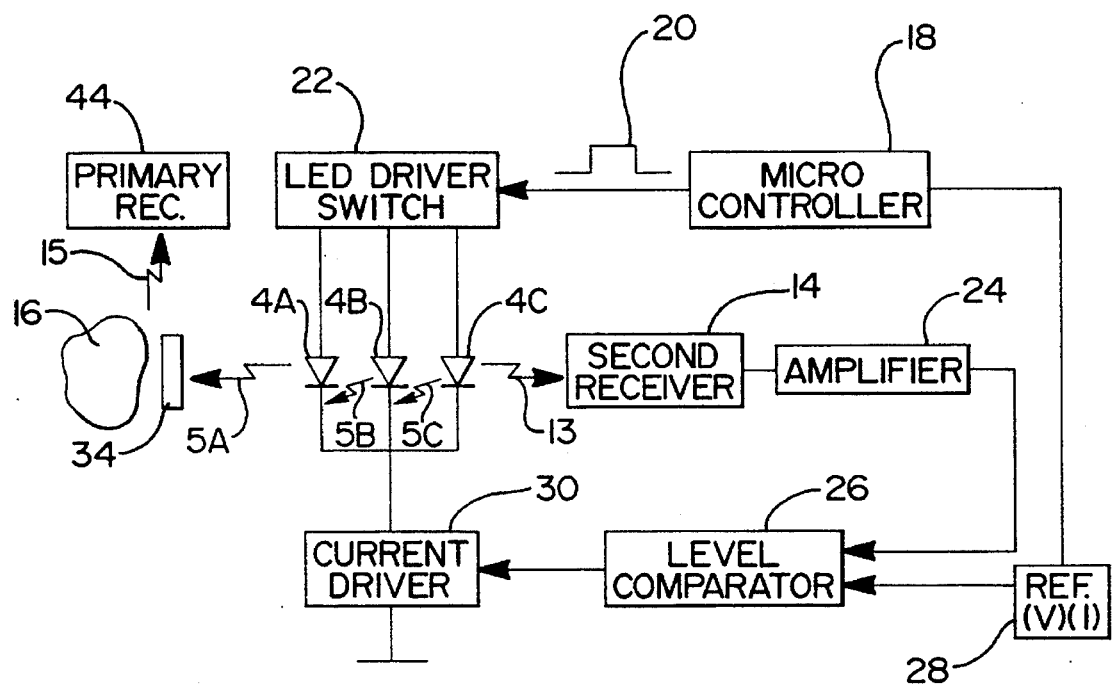
FIG. 2 is a schematic view of an alternate embodiment of the present invention.

The sketch in FIG. 2 shows an alternate embodiment of the present invention where an output divider 40 is not used to manipulate the final color signal output but rather a feedback circuit based on the output of the secondary receiver 14 is used to regulate the light power output of the LEDs 4A, 4B and 4C.

The secondary receiver 14 reacts to the light output from the light emitting diodes 4A, 4B and 4C and outputs an electrical signal which is fed to secondary amplifier 24 whose output is connected to a level comparator 26. The level comparator 26 compares the output from the secondary amplifier 24 to a reference voltage and current 28 which can be generated from a microcontroller 18 or from a separate source 28 and then makes an adjustment to the level of the current driver 30 so that the light output from the light emitting diodes 4A, 4B and 4C is adjusted to be controlled to a desired level for accuracy of the color measurement thereby functioning as a feedback system.

When references are made to one or more light emitting diodes in this connection, it should be noted that while it is true that according to the process used, three light emitting light transmitters each emitting light to a predetermined wavelengths (red, green, blue) are sufficient for color determination, any number of light emitting diodes can be used to suit the purposes needed for the color determination. If necessary, the number and colors of light emitting diodes can be increased still further.

The LEDs 4A, 4B and 4C can be driven by a power current driver 30 and a LED driver switch 22 where the operation of the LEDs 4A, 4B and 4C are controlled by the closing of the LED driver switch 22 upon command from the microcontroller 18. The LEDs 4A, 4B and 4C are commonly illuminated sequentially in a rapid fashion with the primary receiver 44 and its associated circuitry effectively measuring the amplitude of the reflected light 15 as each of the separate LEDs 4A, 4B and 4C are powered. A method of using sequentially illuminated red, green and blue LEDs to measure the color of an object is disclosed in U.S. Pat. Nos. 5,021,645 and 5,150,174 and where the operation of a light detector is disclosed and comprises any commercially available photo detector such as a PIN type photodiode available from Hamamatsu as Part No. S1223-01.

Figure 3:
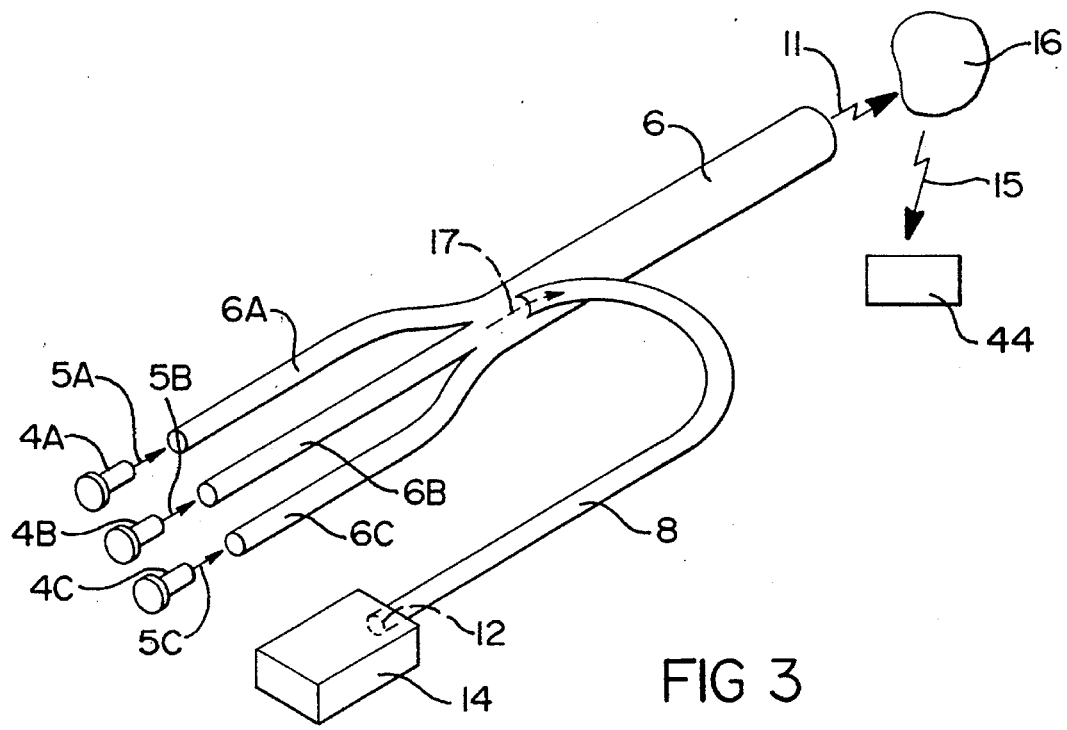
FIG. 3 is a schematic view of the present invention showing a split fiberoptic cable.

FIG. 3 illustrates an alternate embodiment of a portion of the color sensor system of the present invention as shown in FIG. 1 or FIG. 2. It consists of one or more light emitting diodes 4A, 4B and 4C which emit light 5A, 5B and 5C respectively in a predetermined limited characteristic range of chromaticity directed towards individual fiberoptic cables 6A, 6B and 6C respectively which are then combined and randomized into fiberoptic cable 6 where the transmitted light is conducted and emitted as emitted light 11 and directed towards an object 16 whose color is to be measured. A portion of the fiberoptic bundle 6 is split off into split cable 8 and directed towards a secondary receiver 14 such that the output end 12 of the split cable 8 is positioned to direct a secondary light 17 towards the secondary receiver 14. In this manner, most of the output light 5A, 5B and 5C from the light emitting diodes 4A, 4B and 4C respectively is transmitted to the object 16 by way of randomized fiberoptic bundle 6 where a portion of the transmitted light output 5A, 5B and 5C shown as secondary light 17 is split off the fiberoptic bundle 6 by way of split cable 8 which directs the secondary light 17 to a secondary receiver 14 for use in a system as shown in FIG. 1 or FIG. 2.

The fiberoptic bundle 6 is randomized and can be sized to further balance the light power output from the LED's 4A, 4B and 4C while minimizing the overall diameter of the fiberoptic bundle 6 by using the technique disclosed in U.S. Pat. No. 5,229,841, the disclosure of which is hereby expressly incorporated by reference.

Now referring to FIG. 4, a schematic representation of a portion of the color measurement system of the present invention is shown where a light box 50 is used to mount the light emitting diodes 4A, 4B and 4C which are connected to the optical device 34 which is in this case a fiberoptic bundle 6 where the fiberoptic bundle 6 is formed by the individual fiberoptic cables 6A, 6B and 6C that are associated with each individual light emitting diode 4A, 4B and 4C respectively. Again, one or more light emitting diodes can be used to illuminate the object 16 whose color is to be measured or other means of illumination can be used.

A secondary receiver 14 is mounted within the light box 50 and receives the light 51A, 51B and 51C emitted off the backside of each of the light emitting diodes 4A, 4B and 4C and then uses the output of the secondary receiver 14 in a similar fashion to that shown in FIG. 1 or FIG. 2 to control the light output from each light emitted diode 4A, 4B and 4C using feedback techniques or to increase or decrease the signal from the primary receiver 44 using a divider 40 which produces a measurement signal 41 which is then used for manipulation by a microprocessor 46 to generate a signal indicative of the color of the object 16.

FIG. 5 is a timing diagram of the switching signals from the LED driver switch 22 switching each of the LEDs 4A, 4B and 4C on or off and the autozero signal AZ. Clearly illustrated is the timing between the autozero signal AZ and any of the LED energization signals where if all of the LEDs are switched off, then the autozero signal AZ is switched high. This prevents the divider 40 as shown in FIG. 1 from seeing a very low value for the divisor which could drive it into saturation with a resulting long recovery time and resulting measurement inaccuracies. A "1" is used to indicate a high or energized state, and a "0" is used to indicate a low or nonenergized state.

When detecting colors of an object using LED light sources, a very sensitive receiver is required. The system thus becomes sensitive to drift due to ambient temperature changes by emitting diode thermal noise etcetera. Present color sensors solve this problem with LED temperature compensators or with temperature feedback to a microprocessor. The present invention cancels out all of the above system errors except for drift in the primary or secondary receivers by referencing the light received from the colored object to the light transmitted to a secondary receiver from the light emitting diodes. Reference is now made to the method of processing the reflected light from the object whose color is to be measured as disclosed in U.S. Pat. No. 5,021,645. The circuitry described is intended to be integrated with that herein described to effectuate either a photoelectric color sensor using a divider circuit as shown in FIG. 1 or a reference level comparator as shown in FIG. 2.

Figure 6:
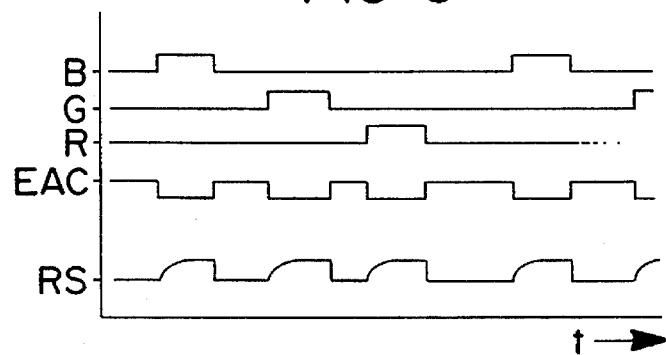
FIG. 6 is a signal timing chart correlating various relationships within the present invention.
Figure 7:
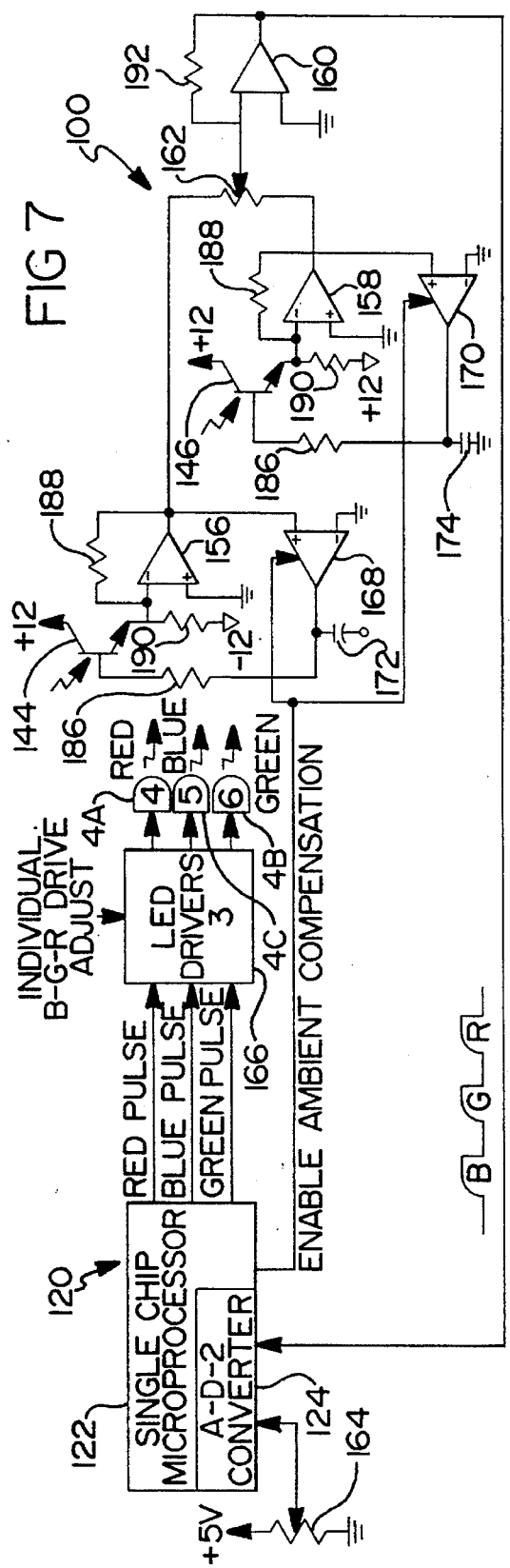
FIG. 7 is a schematic diagram of the preferred embodiment of the present invention photoelectric color sensor.

Now referring to FIGS. 6 and 7, LEDs 126, 128 and 130 are driven sequentially by logic circuit 120 to illuminate capsule 112 with blue, green and red light as illustrated. The reflected light from each color is detected by phototransistors 144 and 146 (see FIG. 7), amplified by operational amplifiers 156 and 158, respectively, and summed in operational amplifier 160. A potentiometer 162 has its fixed resistance portion across the outputs of op amps 156 and 158 and the wiper connected to the input of op amp 160 to balance sensitivity variations between phototransistors 144 and 146 Op amp 160 outputs resultant sample signals to A-D converter 124 within microprocessor 122. Microprocessor 122 generates timing pulses for the red, blue and green LEDs 126, 128 and 130, respectively, and in synchronism with each pulse samples the output of amplifier 160 and converts it to a digital value. These digital values for each color are stored in memory and may be processed with any of several algorithms to determine the color of the target being viewed. One such known algorithm or conversion relationships are known as Munsell equations which describes an exact color by way of a vector on a circle with its origin at the center of the circle. Alternatively, the red, green and blue values may be compared to a stored set of colors obtained by viewing a reference color during a "learn" mode at set-up. This is functionally described in FIG. 9. For this mode, a second potentiometer 164 is connected to a second A-D converter 124 channel of microprocessor 122 which is proportional to the tolerance to be used when comparing the red, green and blue signals to a set of stored reference values. As discussed hereinabove, more than one set of color reference values can be stored for use in, for example, sequentially checking the color of both ends of a pharmaceutical capsule 112.

Figure 8:
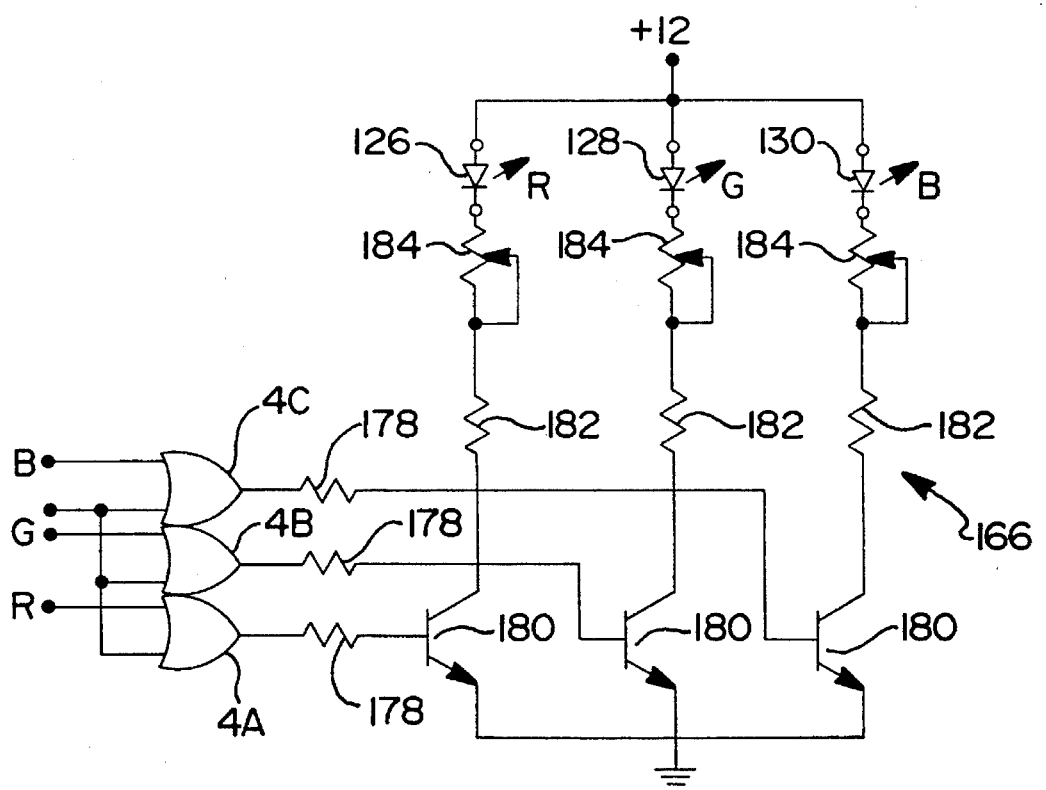
FIG. 8 is a schematic diagram of the LED driver portion of the schematic of FIG. 7.

Red, green and blue pulses from microprocessor 122 drive LED drivers 166 as shown in FIG. 8 which can be adjusted to individually control the red, green and blue LED currents through use of a digitally controlled gain circuit established by the microprocessor 122 and programmable feedback resistance in the final gain stage amplifier circuit 192 (FIG. 7). These are adjusted to provide equal red, green and blue pulse amplitudes out of amplifier 160 when a white target is viewed. This adjustment compensates both for variation in light output versus current among the LEDs and for variations in phototransistor 144 and 146 over the spectral range. An additional drive stage may be added to the blue LED 128 to provide ±12 volt bias for enhanced output.

Sensor 110 is made substantially insensitive to steady state ambient light through the provision of ambient compensating loops consisting of operational transconductance amplifiers 168 and 170, and capacitors 172 and 174. Operational transconductance amplifiers 168 and 170 function as amplifiers only when enabled by the ambient compensation enable (EAC) signals shown in FIG. 4, which are true whenever none of the red, blue and green LEDs 126, 128 and 130, respectively, are energized. Otherwise, the output of amplifiers 168 and 170 are an open circuit which does not provide a discharge path for the voltage stored in capacitors 172 and 174. When amplifiers 168 and 170 are energized, a voltage is stored on capacitors 172 and 174 which withdraws current from the base of the respective phototransistor 144 and 146 to compensate for ambient induced photocurrent in phototransistors 144 and 146. Capacitors 172 and 174 are large enough to retain this voltage during the signal measurement intervals when amplifiers 168 and 170 are not energized. The lowermost signal trace in FIG. 6 represent the resultant sample (RS) signals received by microprocessor 122 from amplifier 160.

The balance of the componentry illustrated in FIGS. 7 and 8 are listed hereinbelow, it being understood that they represent only one of any number of variants upon the represent invention inventive concept.

| REF. NO. | TYPE | VALUE/TYPE |
| --- | --- | --- |
| 122 | Microprocessor | BGHCC11 |
| 126 | LED | HLMP3750 |
| 128 | LED | LDB5410 (Siemens) |
| 130 | LED | HLMP3950 |
| 144,146 | Phototransistors | OP805 |
| 156,158,160 | Op Amps | 34080 |
| 168,170 | Op Amps | CA3080 |
| 176 | OR Gate | CD4081 |
| 178 | Resistor | 1 Kohm |
| 180 | Transistor | 2N3904 |
| 182 | Resistor | 220 ohm |
| 184 | Potentiometer | 2 Kohm |
| 186 | Resistor | 100 Kohm |
| 188 | Resistor | 50 Kohm |
| 190 | Resistor | 100 Kohm |
| 192 | Resistor | 20 Kohm |

Figure 10:
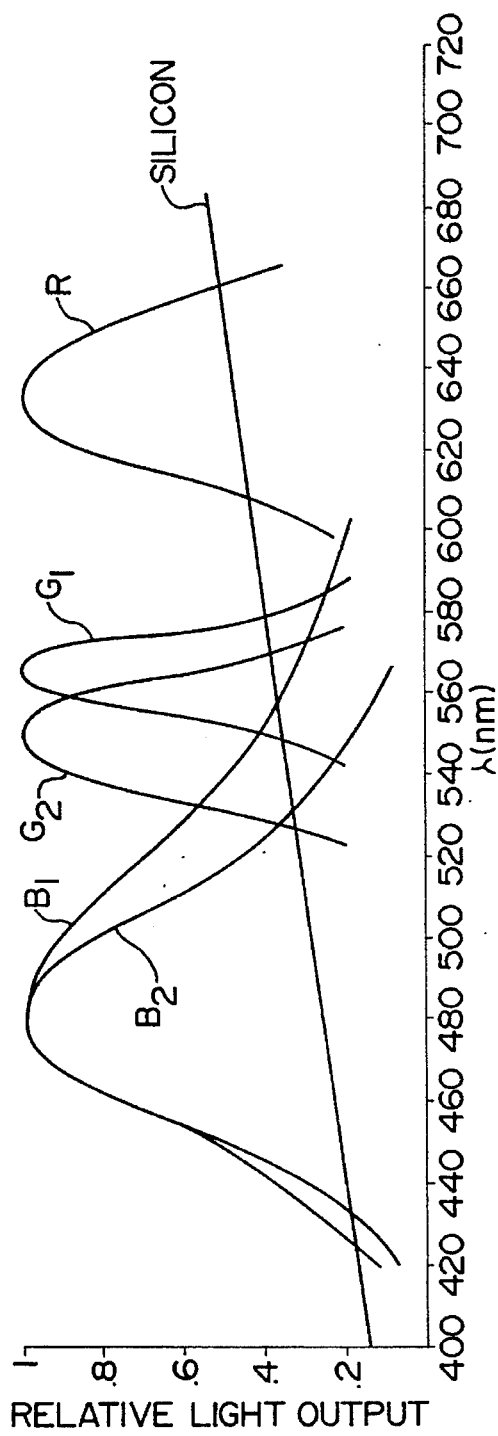
FIG. 10 is a graphical correlation of the wave-length/ relative output of the various light sources employed in the present invention.

Referring to FIG. 10, the relative light output amplitude versus frequency characteristic derived for two blue, two green and one red commercially available LEDs is presented to illustrate that each diode in the red, green and blue categories have their own characteristic limited range of chromaticity which substantially differs from the others and that collectively they substantially encompass the entire visible light spectrum.

Figure 9:
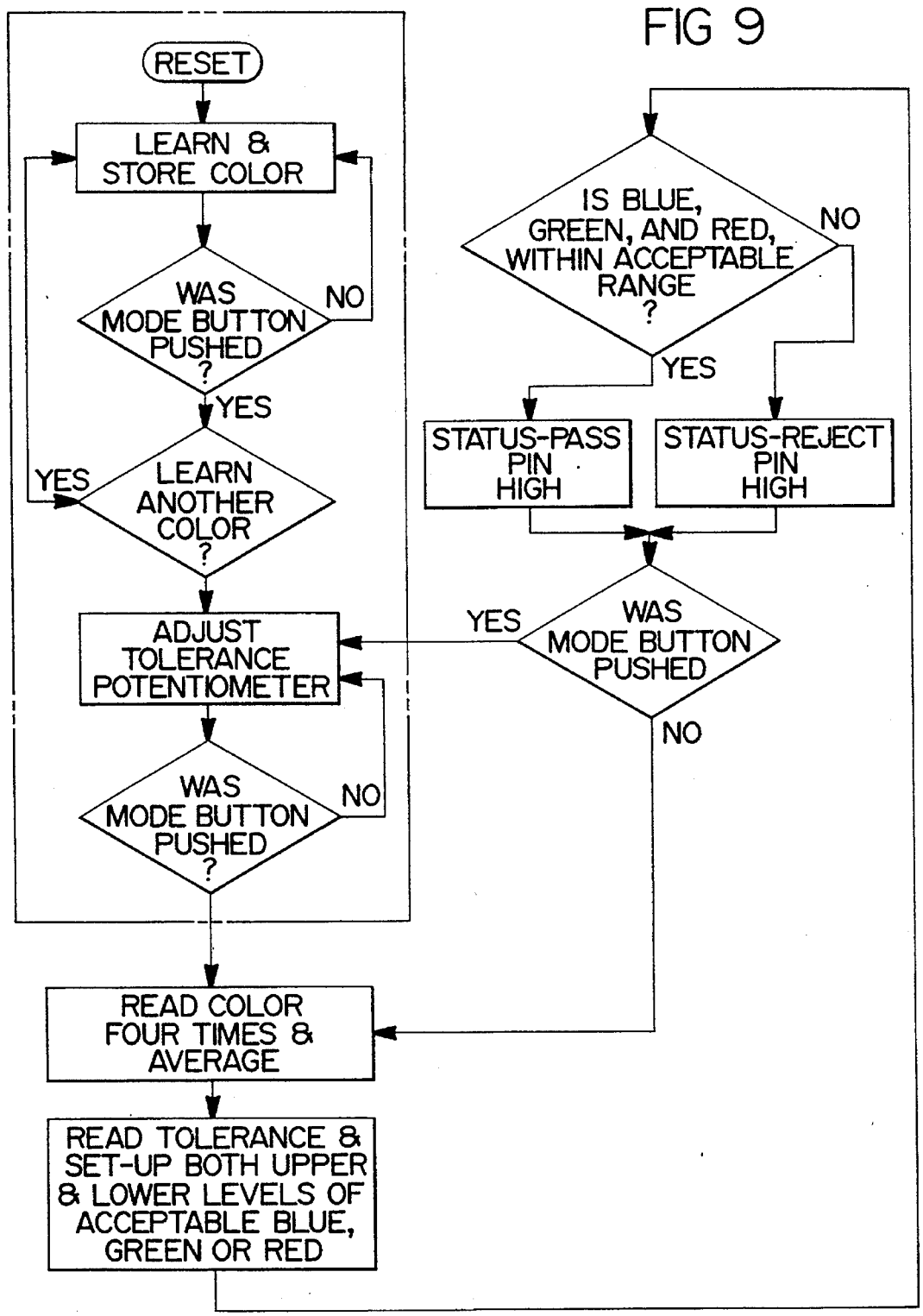
FIG. 9 is a simplified flow chart of software implemented in the microprocessor of the present invention.

Referring to FIG. 9, the basis logic program within microprocessor 122 is illustrated. The single-chip microprocessor 122 adds intelligence and versatility to the color sensing system 110 in a way that would be difficult to achieve by discrete means such as through programmable logic devices. The microprocessor chip 122 performs three general tasks in the operation of the color sensor 110. (1) it maintains control of the emitting and receiving photodiodes 126, 128, 130, 144 and 146, (2) it provides input analysis and response to the collected sensor data, (3) it manages local and remote communication interfaces. These functions are primarily originated by software driven inputs and outputs from the microprocessor chip 122. Each of these functions are expounded upon below.

The first sensor control task (1) is provided by software algorithms which switch the red, green and blue LEDs 126,130 and 128 on and off in a proper order in conjunction with the inversion of the autozero signal. Routines are also available for a programmable gain control on the receiving input amplifier, thus allowing for self calibration, in order to adjust to target applications of varying reflective gains. The routine attempts to achieve a linear but maximal gain for all three hues without driving the receiving amplifier into saturation for any individual hue. Circuitry and software is in place to provide an interrupt mechanism which permits triggering of the sensor readings based upon target presence or relative position in the sensor field of view. Initiation of this triggering mechanism can be accomplished through remote programming or by on-board dip switches. These are several pushbuttons on the sensor that are interpreted by the microprocessor. The mode button is a multipurpose control switch for progressing the sensor operation from a learn-color mode to the normal run mode of operation. In particular, the first push of the mode button out of reset will learn the color in the sensor view, another push will cause it to learn the second color if the device has been previously configured for more than one color. After learning colors the next push puts it in the tolerance setting mode, and the next would put it in the normal run mode. If the mode button is pushed in the run mode, the device again returns to the tolerance set mode.

The second task (2) of the microcomputer (microprocessor) chip 122 is for data analysis. After measuring the analog input and converting it to digital information, one of several paths can be taken to analyze the data, based on user preconfigured settings. The input readings may or may not be averaged, the choice being determined by how much response speed versus noisy signal suppression that is desired. Averaging slows the response time of the device but increases repeatability in the color determination. The readings may or may not be normalized, that is where each individual hue or LED light reflection reading is expressed as a ratio of the total of all three hue readings. The chief consequence of dealing with absolute rather than normalized voltage values for hue is that it renders the analysis more susceptible to variations in intensity of the reflected light due to sensor-to-target distance variation; this is not a problem when normalized. However, if the intensity of the reflected light can be held relatively constant, absolute readings will distinguish different tones of the same color hue, while normalizing masks the distinction. One-color or multi-color sensing can be selected by dip switch or remote terminal programming as well. In the current design, the output of the color analysis is made up of two go/no-go control lines which provide a go/no-go signal. One line fires high for a passing color, the other for a failure of the color match to the stored standard. Each line has a corresponding LED indicator for demonstration purposes. When there is a match to any stored color, the go-signal pin fires. Plug-in external sensors may serve as market inputs to distinguish which color is being tested at a given time (mentioned above as part of the triggering mechanism).

The third task (3) incorporates the elements of the user interface. Simple interface elements are provided such as the reset button, which restarts the device and sets it in the learn color mode. The second button is the mode button, which as described above, progresses the device operation sequentially through the available modes. LED indicators under the control of the microprocessor, distinguish the state of the device operation. These indicators are the learn versus run mode, color good versus bad, learn color versus tolerance set mode, first color or second color learn, and power-on LEDs. User defined set-up configurations can be entered in two ways. The operating configuration can be set by either switching a bank of dip switches located on the sensor (local) or by serially communicating to the sensor from a (remote) personal computer or dumb ASCII terminal. Serial communication software is available in the microcomputer chip coding. Serial communication can be initiated during the run mode which will return the operating state to the learn mode.

It is to be understood that the invention has been described with reference to a specific embodiment to provide the features and advantages previously described and that such specific embodiments are susceptible of modification, such as will be apparent to those skilled in the art. For example, the preferred embodiment of the invention represents in application specific design for a particular shape target object as well as a specific set of colors and hue. Furthermore feedback resistor 192 can be replaced by a potentiometer or a programmable resistor to selectively adjust the gain of amplifier 160. Also any number of color standards can be learned and stored and any number of readings can be averaged. It is contemplated that the above recited component values and arrangements could be varied without departing from the spirit of this invention. Accordingly, the foregoing is not to be construed in a limiting sense.

It will be appreciated that various other modifications or alternatives to the above described embodiments will be apparent to a person skilled in the art without departing from the inventive concept of splitting off a portion of the light output from a light source to be directed at a secondary receiver for use in regulating the light source output or to mathematically adjust the color output signal to compensate for component drift or other variations.

I claim:

1. A photoelectric color sensor comprising: at least two light sources disposed in a fixed array directed toward an optical transmission device having a primary path for transmitting light from said light sources to an object whose color is to be measured and a secondary path, each of said light sources operable to generate emitted light having a limited characteristic range of chromaticity differing from the characterization range of chromaticity of each other light source;

a primary photosensitive receiver positioned to receive said emitted light reflected from an object whose color is to be measured;

a secondary photosensitive receiver positioned to receive a portion of said emitted light transmitted from said light sources through said secondary path; said secondary photosensitive receiver generating an output signal representing the level of said emitted light;

a control circuit connected between said secondary photosensitive receiver and said light sources for controlling the light energy emitted by said light sources, said control conduit having a level comparator electrically connected to said secondary photosensitive receiver for comparing said output signal to a reference level and controlling a current driver for powering said light sources to produce a level of emitted light according to said reference level logic means in circuit with said light sources and said primary photosensitive receiver operative to sequentially energize said light sources and to receive resultant sample signals from said primary photosensitive receiver in response to each said light source energization, said logic means being further operative to generate a resultant signal as a function of said sample signals, to compare said resultant signal with a predetermined reference standard and generate a condition output signal when the difference between said resultant signal and reference standard exceeds a tolerance limit, wherein said reference standard has been established during an earlier test mode operation of said logic means in which a standard color mode operation of said logic means in which sensing region and sequentially illuminated by said light sources, said reference standard and said resultant signal comprising a respective single signal for each said characteristic range of chromaticity.

2. The photoelectric color sensor of claim 1, wherein said optical transmission device is a fiberoptic cable.

3. The photoelectric color sensor of claim 2, wherein said fiberoptic cable is bifurcated to form said primary path and said secondary path.

4. The photoelectric color sensor of claim 3, wherein said autozero signal is generated by a microprocessor.

5. The photoelectric color sensor of claim 1, wherein said control circuit further comprises: an amplifier means electrically connected to said secondary photosensitive receiver and to said level comparator.

6. The photoelectric color sensor of claim 5, wherein said light sources are light emitting diodes.

7. The photoelectric color sensor of claim 6, wherein said reference signal source is a microcontroller where said microcontroller generates a switching signal which is electrically connected to a light emitting diode driver switch which is in turn electrically connected to said light sources for switching said light sources on and off.

8. The photoelectric color sensor of claim 7, wherein said light emitting diodes emit light at a peak wavelength of approximately 605 nanometers, and at a peak wavelength of approximately 555 nanometers and at a peak wavelength of approximately 470 nanometers.

9. The photoelectric color sensor of claim 1 wherein said primary photosensitive receivers and said secondary photosensitive receivers are of the type using a PIN photodiode.

10. A photoelectric color sensor comprising:

at least light sources disposed in a fixed array directed toward an optical transmission device having a primary path for transmitting light from said light sources to an object whose color is to be measured and a secondary path, each of said light sources operable to emit light having a limited characteristic range of chromaticity differing from the characterization range of chromaticity of each other light source;

a primary photosensitive receiver positioned to receive reflected light from said object whose color is to be measured, said primary photosensitive receiver generating a primary signal according to a level of said reflected light;

a secondary photosensitive receiver positioned to receive said light transmitted from said light sources through said secondary path, said secondary photosensitive receiver generating a secondary signal according to a level of said light transmitted through secondary path;

means for dividing said primary signal from said primary photosensitive receiver by said secondary signal from said secondary photosensitive receiver the result being transmitted to a microprocessor for use in calculation of the color of said object whose color is to be measured.

11. The photoelectric color sensor of claim 10, wherein said optical transmission device is a fiberoptic cable bifurcated to form said primary path and said secondary path.

12. The photoelectric color sensor of claim 10, wherein said signal from said primary photosensitive receiver and said signal from said secondary photosensitive receiver are amplified and manipulated prior to connection to said divider means.

13. The photoelectric color sensor of claim 10, wherein said light sources are light emitting diodes.

14. The photoelectric color sensor of claim 13, wherein an autozero signal is added to said signal from said secondary photosensitive receiver when said light sources are not energized.

15. The photoelectric color sensor of claim 13, wherein said light emitting diodes are powered by a current driver and switched on and off by a light emitting diode driver switch connected and controlled by a microprocessor.

16. The photoelectric color sensor of claim 10, wherein an output of said divider is connected to a microprocessor for color interpretation.

17. A method of measuring the color of an object comprising:

providing at least two light sources disposed in a fixed array directed toward an optical transmission device having a primary path for transmitting light from said light sources to an object whose color is to be measured and a secondary path, each of said light sources operable to emit light having a limited characteristic range of chromaticity;

providing a primary photosensitive receiver positioned to receive reflected light from said object whose color is to be measured for generating a primary signal indicative of a level of said reflected light;

providing a secondary photosensitive receiver positioned to receive light from said secondary path for generating a secondary signal indicative of a level of light transmitted along said secondary path;

providing a microprocessor for calculation of the color of said object dependent on said primary signal and said secondary signal; energizing at least one of said light sources having a selected chromaticity;

dividing said primary signal by said secondary signal to obtain a resultant; and transmitting said resultant to said microprocessor for calculation of a level of color.

18. A method of measuring the color of an object comprising:

providing at least two light sources disposed in a fixed array directed toward an optical transmission device having a primary path for transmitting light from said light sources to an object whose color is to be measured and a secondary path, each of said light sources operable to emit light having a limited characteristic range of chromaticity;

providing a primary photosensitive receiver positioned to receive reflected light from said object whose color is to be measured for generating a primary signal indicative of a level of said reflected light;

providing a secondary photosensitive receiver positioned to receive light from said secondary path for generating a secondary signal indicative of a level of light transmitted along said secondary path;

providing a microprocessor for calculation of the color of said object dependent on said primary signal and said secondary signal;

providing a current driver to power said light sources;

providing a level comparator connected to said secondary photosensitive receiver and to said current driver;

energizing at least one of said light sources having a selected chromaticity;

comparing said secondary signal to said reference power signal and transmitting a resultant to said current driver;

adjusting the output of said current driver according to said resultant to control the level of light transmission from said light sources; and transmitting said primary signal to said microprocessor for calculation of the color of said object.

\* \* \* \* \*